(12) United States Patent
Kawamoto

(10) Patent No.: US 9,053,360 B2
(45) Date of Patent: Jun. 9, 2015

(54) IMAGE INSPECTION APPARATUS, IMAGE FORMING APPARATUS, IMAGE INSPECTION METHOD, AND IMAGE INSPECTION PROGRAM

(71) Applicant: Hiroyuki Kawamoto, Kanagawa (JP)

(72) Inventor: Hiroyuki Kawamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 298 days.

(21) Appl. No.: 13/674,256

(22) Filed: Nov. 12, 2012

(65) Prior Publication Data

US 2013/0136315 A1    May 30, 2013

(30) Foreign Application Priority Data

Nov. 25, 2011   (JP) ................. 2011-258284
Sep. 3, 2012    (JP) ................. 2012-193500

(51) Int. Cl.
G06K 9/00    (2006.01)
G06T 5/00    (2006.01)
G06T 7/00    (2006.01)

(52) U.S. Cl.
CPC ........ *G06K 9/00442* (2013.01); *G06K 9/00483* (2013.01); *G06T 7/0002* (2013.01); *G06T 5/00* (2013.01)

(58) Field of Classification Search
None
See application file for complete search history.

(56) References Cited

U.S. PATENT DOCUMENTS

| 5,694,228 | A | * | 12/1997 | Peairs et al. ................. 358/538 |
| 6,486,971 | B1 | | 11/2002 | Kawamoto |
| 7,570,788 | B2 | * | 8/2009 | Tsukamoto et al. .......... 382/112 |
| 2001/0019429 | A1 | | 9/2001 | Oteki et al. |
| 2001/0050778 | A1 | | 12/2001 | Fukuda et al. |
| 2002/0027670 | A1 | | 3/2002 | Takahashi et al. |
| 2002/0054374 | A1 | | 5/2002 | Inoue et al. |
| 2004/0125420 | A1 | * | 7/2004 | Tsutsumi ...................... 358/498 |
| 2004/0131253 | A1 | * | 7/2004 | Wang ............................ 382/181 |
| 2004/0156076 | A1 | | 8/2004 | Togami et al. |
| 2005/0168765 | A1 | * | 8/2005 | Akune et al. ................. 358/1.13 |
| 2005/0179954 | A1 | * | 8/2005 | Arai et al. .................... 358/3.26 |
| 2006/0061830 | A1 | * | 3/2006 | Sakakibara .................. 358/448 |
| 2007/0127044 | A1 | * | 6/2007 | Shimokawa ................... 358/1.9 |
| 2007/0146816 | A1 | * | 6/2007 | Aoki ............................. 358/474 |
| 2007/0291324 | A1 | * | 12/2007 | Kamei et al. ................. 358/474 |
| 2008/0094647 | A1 | | 4/2008 | Takahashi et al. |
| 2009/0147320 | A1 | * | 6/2009 | Lee .............................. 358/475 |
| 2010/0067061 | A1 | * | 3/2010 | Hayashi ...................... 358/3.26 |

(Continued)

FOREIGN PATENT DOCUMENTS

| JP | 3-007466 | 1/1991 |
| JP | 2007-148027 | 6/2007 |
| JP | 2010-151606 | 7/2010 |

*Primary Examiner* — Barry Drennan
*Assistant Examiner* — Samah Beg
(74) *Attorney, Agent, or Firm* — Harness, Dickey & Pierce, P.L.C.

(57) ABSTRACT

An image inspection method and apparatus for inspecting images output on sheets including a reference white plate disposed at a position of the transport route of sheet while facing a scan position for scanning a sheet; a contact glass disposed opposite the reference white plate; an image scanning device fixed facing the scan position to conduct a scanning operation through the contact glass, a noise detector to detect a first noise image in a blank area of the inspection sheet by scanning the blank area of the inspection sheet, and a second noise image in the reference white plate by scanning the reference white plate; and a stain source determination unit to determine a noise origin from the contact glass or the reference white plate.

10 Claims, 8 Drawing Sheets

(56) References Cited

U.S. PATENT DOCUMENTS

| | | |
|---|---|---|
| 2010/0188714 A1 | 7/2010 | Yamakawa |
| 2011/0149351 A1* | 6/2011 | Wakui et al. .................. 358/463 |
| 2011/0158483 A1* | 6/2011 | Ming et al. ................... 382/112 |
| 2012/0002984 A1 | 1/2012 | Kawamoto et al. |
| 2012/0148114 A1* | 6/2012 | Ikubo ........................... 382/112 |
| 2013/0250370 A1* | 9/2013 | Kojima et al. ................ 358/405 |
| 2013/0301070 A1* | 11/2013 | Saisho ......................... 358/1.13 |

* cited by examiner

SCANNING WITHOUT SHEETS

SHEET TRANSPORTATION DIRECTION

SCANNING ON SHEET

SHEET TRANSPORTATION DIRECTION

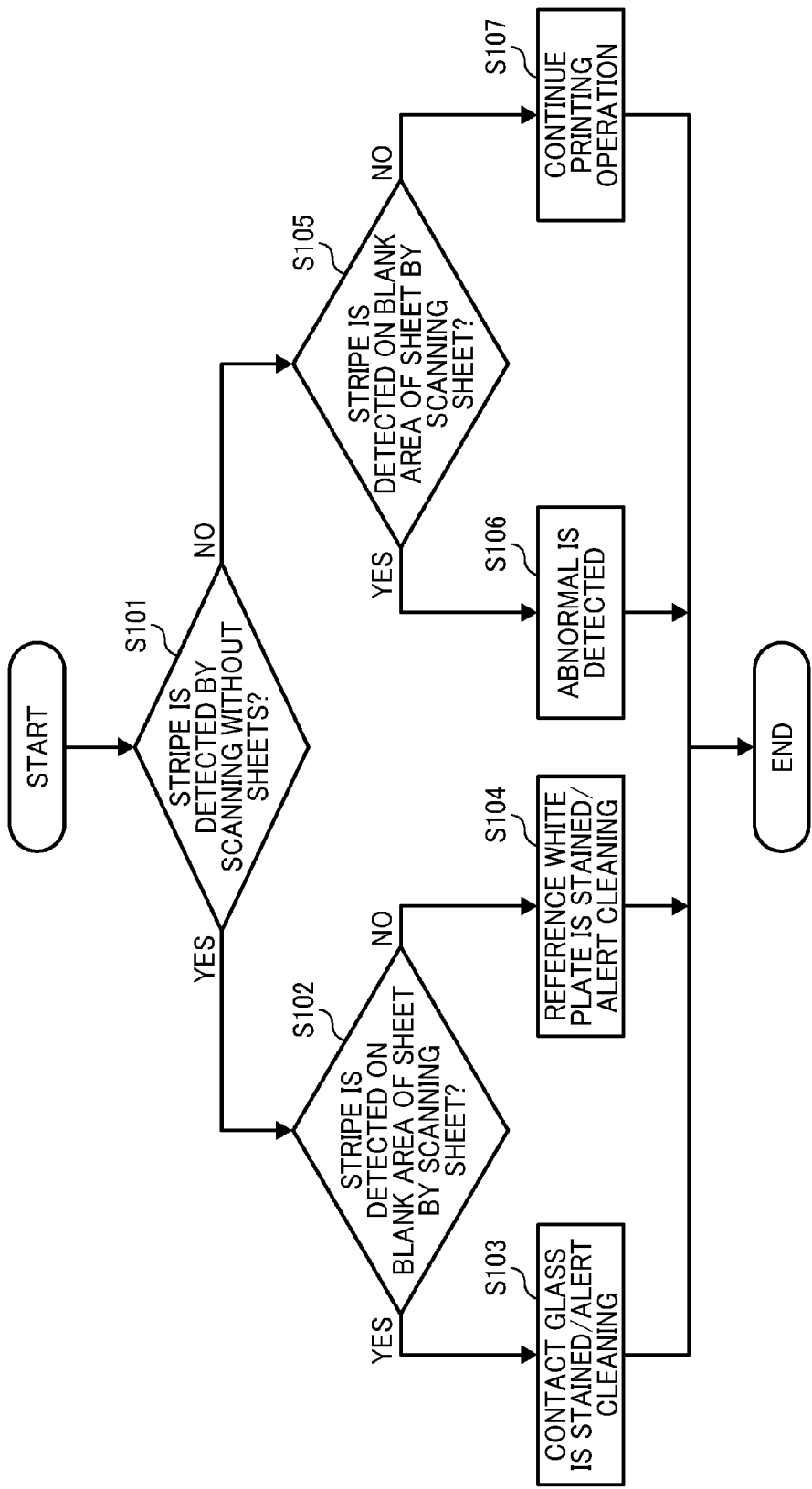

IMAGE INSPECTION APPARATUS, IMAGE FORMING APPARATUS, IMAGE INSPECTION METHOD, AND IMAGE INSPECTION PROGRAM

CROSS-REFERENCE TO RELATED APPLICATIONS

This application claims priority to Japanese Patent Application Nos. 2011-258284, filed on Nov. 25, 2011, and 2012-193500, filed on Sep. 3, 2012 in the Japan Patent Office, which are hereby incorporated by reference herein in their entirety.

BACKGROUND

1. Technical Field

The present invention relates to an image inspection apparatus to inspect images formed on sheets of recording media by an image forming apparatus such as a printer, a multi-functional apparatus using image data prepared from print data, an image forming apparatus provided with the image inspection apparatus, an image inspection method, and an image inspection program.

2. Description of the Background Art

Printers or the like form images on recording sheets based on print data. To produce high-quality printed images, the printers may be provided with image inspection apparatuses to inspect the output images.

Conventional image inspection apparatuses use an image scanner to scan images printed on sheets of paper, etc., and compare the scanned images to a model image prepared in advance. For example, in the case of offset printing machines, which use the same printing plates to print a large number of copies, image inspections are conducted by scanning a high-quality image with an image scanner of an image inspection apparatus and using the scanned image as the model image.

At present, such image inspection capabilities are also desired for printers used for on-demand printing, in which print data may be different for every sheet and consequently it is not realistic to prepare model images. It is possible to generate a model image when a print request is issued with print data, using, for example, a configuration that uses image data from original image data (print data) that has not been scanned as a standard for comparison and inspecting target printed images, which is disclosed in JP-2007-148027-A.

In conventional image inspection, the image scanner for scanning inspection of target printed images is a sheet-through type, in which a document sheet printed with an image thereon is transported in a certain direction and an optical sensor having an opening disposed at a given position along the transportation route detects light reflected from the document sheet to scan the printed image. The opening is fitted with a contact glass that contacts the document sheet, and thus the distance between the optical sensor and the document sheet can be kept constant by the contact glass. Further, a reference white plate or background scanning plate is disposed opposite the contact glass via the document transport route that also guides the document sheet. With such a configuration, the document sheet may contact not only the contact glass but also the reference white plate. Further, because the inspection target printed image has just been printed, the ink may not be completely dry by the time image inspection is conducted. As a result, the contact glass and the reference white plate may be stained with ink where they contact the document sheet. Stains on the contact glass may get mixed in with the scanned image and appear as noise, thereby degrading scanning precision.

If inspection is conducted under such conditions, it becomes difficult to determine whether a poor inspection result is caused by the poor quality of the inspection target printed image itself or by stains on the contact glass, by which a false inspection or miss-inspection may occur.

Further, because the reference white plate is used as a standard for shading correction in image scanning, stains on the reference white plate may also get mixed with the scanned image as noise. If shading correction is not conducted effectively due to such stains, both image scanning precision and inspection precision deteriorate.

Such false inspection or miss-inspection and poor inspection precision may be prevented by removing stains on the contact glass and the reference white plate periodically, or by displaying a stain removal prompt when the detected light intensity of the reference white plate drops below a critical threshold and removing the stain.

Such periodic stain removal can be conducted by monitoring by a user such as an administrator. To conduct such removal, operation of the image inspection apparatus and/or image forming apparatus must be stopped, but if for some reason the image inspection apparatus and/or image forming apparatus cannot be stopped immediately, such stain removal may not be conducted at an appropriate timing.

Further, because the reference white plate is scanned through the contact glass, the low intensity of detection light coming from the reference white plate may be caused by stains on either the contact glass or on the reference white plate; i.e., the stain origin cannot be identified. Therefore, the image scanner must stopped and stains removed from both the contact glass and the reference white plate, and after confirming that the detection light intensity of the reference white plate again achieves a desired value, the image scanner must be activated again.

If the stain origin is not the contact glass but the reference white plate, the image scanner may not be required to be stopped immediately and the reference white plate may not be required to be cleaned because image inspection can be conducted without too much degradation of image inspection precision.

If the image inspection can be conducted uninterrupted, the processing performance of image inspection can be enhanced. However, as above mentioned, because the stain origin cannot be identified when the reference white plate is scanned in the conventional method, such enhanced image inspection is not practical.

SUMMARY

The present invention is conceived in light of the above-described problems, and provides a novel an image inspection apparatus for inspecting images output on sheets and transported along a transport route inside the image inspection apparatus by comparing inspection target image data obtained by scanning the sheets with model image data generated from print data used for outputting the images. The image inspection apparatus includes a reference white plate used for a correction process, disposed at a position along the transport route facing a scan position for scanning a sheet; a contact glass disposed opposite the reference white plate; an image scanning device fixed at the scan position to conduct a scanning operation through the contact glass; a noise detector employing a processor to detect a first noise image in a blank area of the inspection sheet by scanning the blank area of the inspection sheet with the image scanner, and a second noise image in the reference white plate by scanning the reference white plate at a timing that a sheet is not present over the reference white plate; and a stain source determination unit using the processor to identify whether the noise originates from the contact glass or the reference white plate, and configured to determine that the contact glass has a stain when the noise detector detects the noise image; and determine that the reference white plate has a stain when the noise detector does not detect the first noise image but does detect the second noise image.

The present invention further provides a novel method of inspecting images output on sheets transported along a transport route inside an image inspection apparatus by comparing inspection target image data obtained by scanning the sheets with model image data generated from print data used for outputting the images, using the image inspection apparatus including a reference white plate disposed at a position of the transport route of sheet facing a scan position for scanning a sheet, the reference white plate being used for a correction process; a contact glass disposed opposite the reference white plate; an image scanning device fixed at the scan position to conduct a scanning operation through the contact glass. The method includes the steps of 1) detecting a first noise image in a blank area of the inspection sheet by scanning the blank area of the inspection sheet; 2) detecting a second noise image in the reference white plate by scanning the reference white plate at a timing that a sheet is not present over the reference white plate; 3) determining that the contact glass has a stain when the noise detector detects the first noise image; and 4) determining that the reference white plate has a stain when the noise detector does not detect the first noise image and the noise detector detects the second noise image.

The present invention further provides a novel non-transitory computer-readable storage medium storing a program that, when executed by a computer, causes the computer to execute a method of inspecting images output on sheets transported along a transport route inside an image inspection apparatus by comparing inspection target image data obtained by scanning the sheets with model image data generated from print data used for outputting the images, using the image inspection apparatus including a reference white plate disposed at a position of the transport route of sheet facing a scan position for scanning a sheet, the reference white plate being used for a correction process; a contact glass disposed opposite the reference white plate; an image scanning device fixed at the scan position to conduct a scanning operation through the contact glass. The method includes the steps of 1) detecting a first noise image in a blank area of the inspection sheet by scanning the blank area of the inspection sheet; 2) detecting a second noise image in the reference white plate by scanning the reference white plate at a timing that a sheet is not present over the reference white plate; 3) determining that the contact glass has a stain when the noise detector detects the first noise image; and 4) determining that the reference white plate has a stain when the noise detector does not detect the first noise image and the noise detector detects the second noise image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 shows one flowchart of a control process for a printing operation conduct-able based on a stain detection result, which can identify a stain-image causing source separately;

Figure 1:
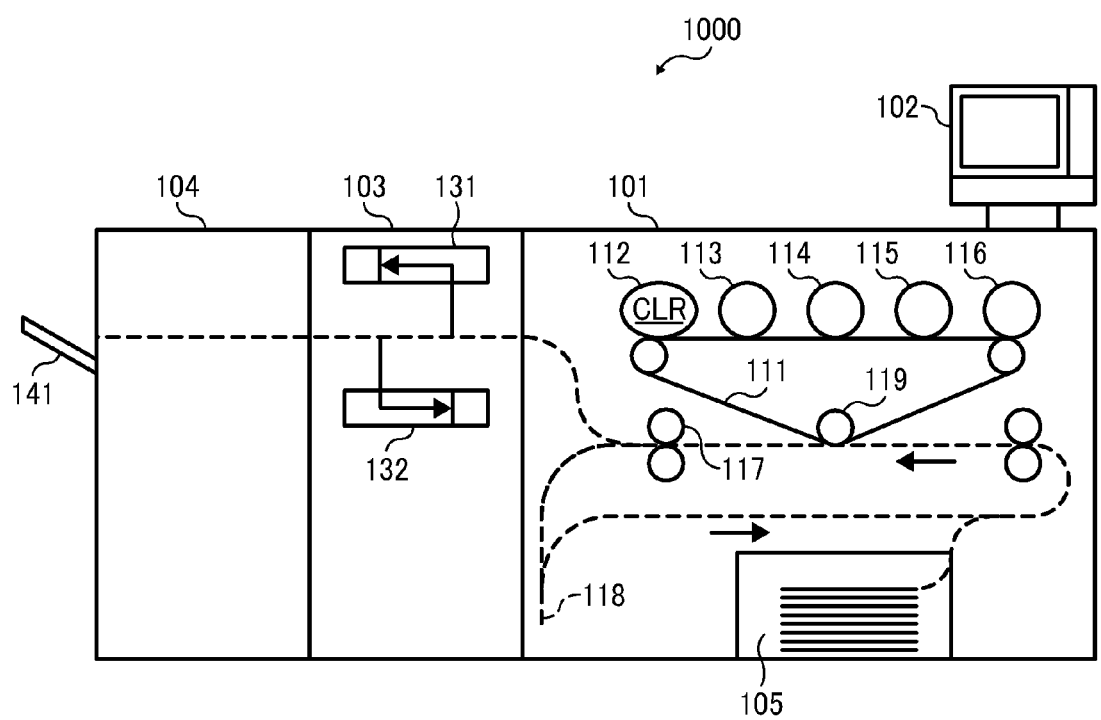
FIG. 1 shows a schematic configuration of an image forming/inspecting system, having an image forming apparatus and an image inspection apparatus, according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is now given of an image forming/inspecting system including an image forming apparatus and an image inspection apparatus, in which the image forming apparatus outputs images based on print data on recording sheets, and the image inspection apparatus having an image scanner inspects the images output on the recording sheets.

When a printing operation is conducted, an image inspection of printed image can be instructed from a control panel of the image forming apparatus. When such inspection is instructed, the image scanner scans images output on a sheet such as paper to obtain inspection target image data. The image inspection apparatus compares the inspection target image data and model image data generated from print data used for outputting (or printing) to inspect printed image.

In the image forming/inspecting system, the image forming apparatus may employ an electrophographic system or an inkjet system, and such image forming apparatus may produce monochrome images or multi-color images, and thereby monochrome or multi-color printed image can be inspected. The image forming apparatus may be a printer but not limited thereto if the image forming apparatus forms images using image data used for outputting, drawn based on print data.

First Example Embodiment

FIG. 1 shows a schematic configuration of an image forming/inspecting system having an image forming apparatus and an image inspection apparatus according to a first example embodiment. As shown in FIG. 1, an image forming/inspecting system 1000 includes, for example, an image forming apparatus 101, an image inspection apparatus 103, and a stacker 104. The image forming apparatus 101 includes, for example, a control unit 102, and an image forming unit controlled by a printer engine. The image forming unit includes, for example, a sheet feed unit 105, photoconductor drums 112, 113, 114, 115, 116, a transfer belt 111, a transfer roller 119, and a fusing roller 117.

Sheets can be transported in a direction shown by an arrow along the dotted line in FIG. 1 from the sheet feed unit 105. Toner images of clear (CLR), black (K), cyan (C), magenta (M), and yellow (Y) formed on corresponding photoconductor drums 112, 113, 114, 115, and 116 can be superimposed on the transfer belt 111, and then transferred to a sheet by the transfer roller 119, and then fused on the sheet by the fusing roller 117. Upon completing the fusing, the sheet is ejected to the image inspection apparatus 103 when a singled-sided printing is conducted, or the sheet is transported to a face reverse path when a duplex printing is conducted, and then the face-reversed sheet is also transferred and fused with toner images, and ejected to the image inspection apparatus 103. Such sheets having printed images may be referred to inspection target sheet or sheet having an inspection target image.

The image inspection apparatus 103 includes, for example, image scanners 131 and 132 to read inspection target images formed on sheets ejected from the image forming apparatus 101, and ejects the inspection target sheet after the scanning. In view of duplex printing, two image scanners 131 and 132 may be disposed so that each side of sheet can be scanned. The image scanning configuration and operation of the image scanners 131 and 132 will be described later with reference to FIG. 7. The stacker 104 stacks sheets ejected from the image inspection apparatus 103 on an ejection tray 141.

The control unit 102 includes, for example, an operation panel used as a user interface. The operation panel includes, for example, a display unit and operation unit having keys. The display unit is used to inform machine status to a user, and to guide the user how to input information, and the operation unit can be used with a touch panel (i.e., display unit) for key operation used for input information.

Figure 2:
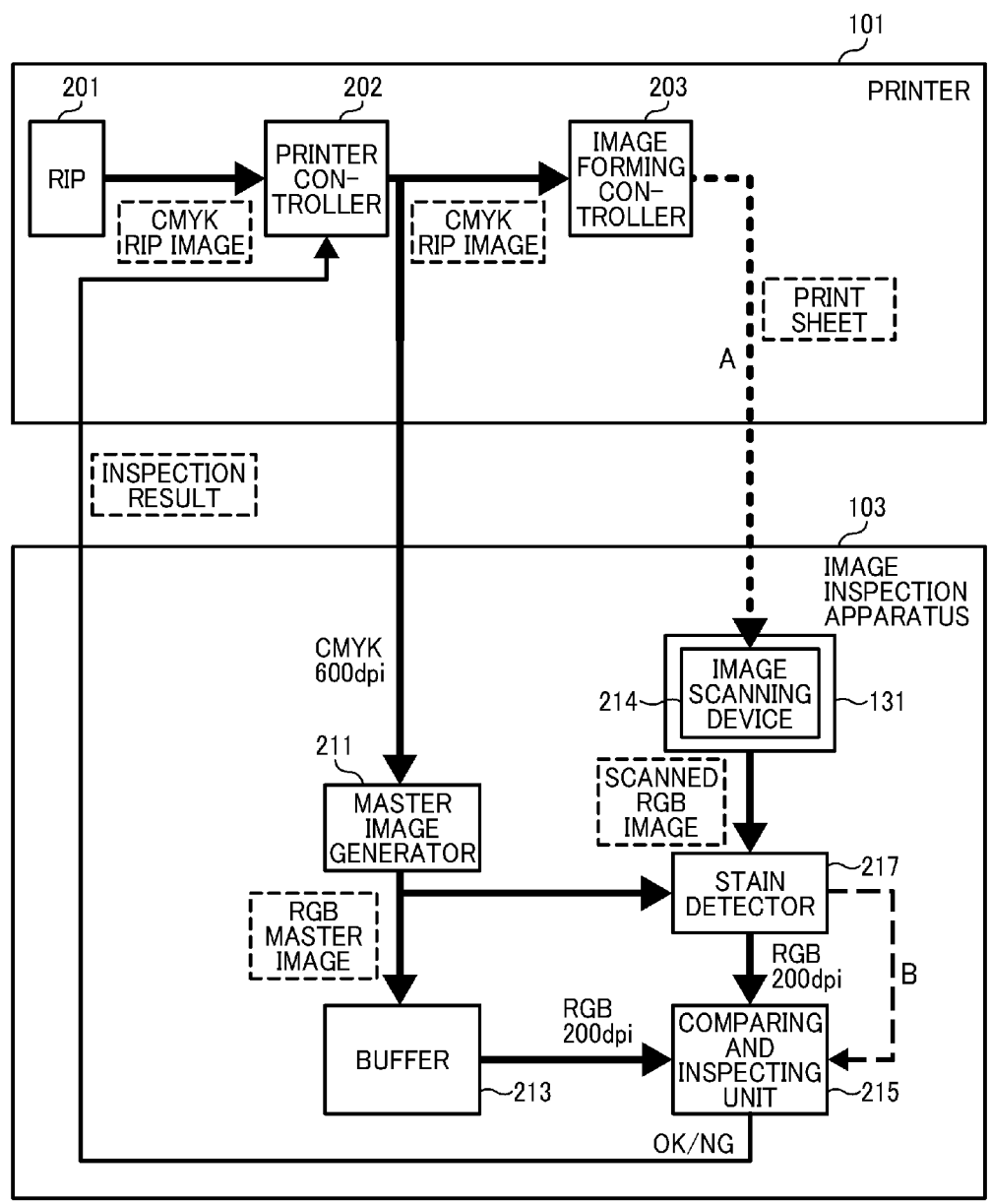
FIG. 2 shows a schematic data processing flow in the image forming/inspecting system of FIG. 1.

FIG. 2 shows data processing flow in the image forming/inspecting system having the image forming apparatus and the image inspection apparatus, in which data flow between units is shown by an arrow. As shown in FIG. 2, the image forming apparatus 101 includes, for example, a raster image processor (RIP) 201, a printer controller 202, an image forming controller 203 disposed along the data flow line.

The RIP 201 receives data, for example, of page description language (PDL) such as PostScript (registered tradmark) and image data such as tagged image file format (TIFF) from an external device, and generates RIP image data of, for example, CMYK and CLR (clear) to be used for printing.

The printer controller 202 transmits the RIP image data to the image forming controller 203 and the image inspection apparatus 103. Further, the printer controller 202 can control a sheet ejection destination of print products in view of an inspection result such as "OK/not good (NG)" information obtained by the image inspection apparatus 103, in which print products of OK may be ejected to one tray and print products of NG may be ejected to another tray. The image forming controller 203 conducts a printing process generating images using the RIP image data of CMYK and CLR to be used for printing, in which the printing process using electrophotography is controlled.

The image inspection apparatus 103 receives data from the image forming apparatus 101 in two data-flow lines: In one data-flow line, the RIP image data of CMYK and CLR to be used for printing flows as data, in which a master image generator 211, and a buffer 213 are disposed at the downstream of data-flow of the RIP image data of CMYK and CLR; in another data-flow line, printed image data flows, and an image scanning device 214, a stain detector 217, and a comparing and inspecting unit 215 are disposed at the downstream of data-flow of printed image data.

The master image generator 211 receives the RIP image data (e.g., CMYK 600 dpi) from the printer controller 202 to generate a master image data (e.g., RGB 200 dpi) as model image data used for an image inspection.

Figure 3:
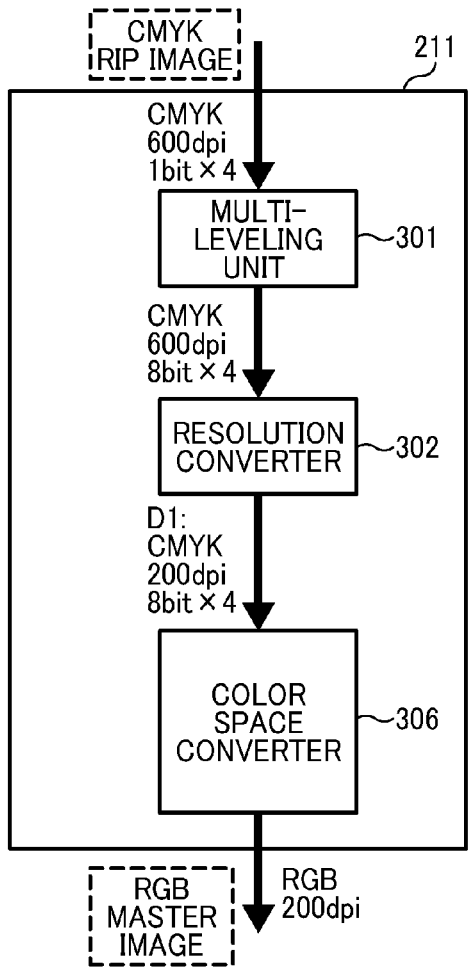
FIG. 3 shows an internal configuration and data processing flow for a master image generator of FIG. 2.

FIG. 3 shows an internal configuration of the master image generator 211. As shown in FIG. 3, input RIP image data (e.g., CMYK 600 dpi, 1 bit×4) is converted to 8-bit multi-level image data by a multi-leveling unit 301. The conversion to multi-level image data can be conducted by a smoothing process by a space filter having a smoothing coefficient, but other known multi-level conversion method can be used. Then, the multi-level image data (e.g., CMYK 600 dpi, 8 bit×4) receives the resolution conversion process such as a conversion from 600 dpi to 200 dpi by a resolution converter 302, by which multi-level image data D1 (e.g., CMYK 200 dpi, 8 bit×4) is obtained. The resolution conversion can use an algorithm that thins out, for example, one pixel for each three pixels, but other known resolution conversion method can be used.

Figure 4:
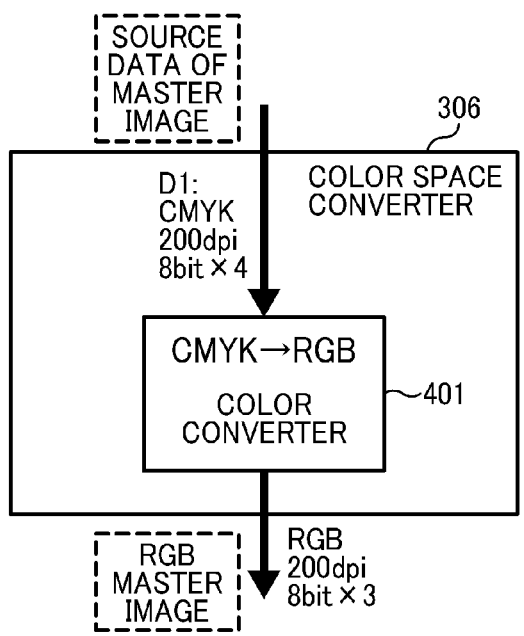
FIG. 4 shows an internal configuration and data processing flow for a color space converter of FIG. 3.

Then, the resolution converted multi-level image data D1 receives a color space conversion process by a color space converter 306. FIG. 4 shows a process of color space conversion by the color space converter 306. The color space converter 306 includes a color converter 401 that can convert the input multi-level image data D1 (CMYK 200 dpi, 8 bit×4) to, for example, data of (RGB 8 bit×3), by which pixel values after the conversion can be obtained. Such conversion can be conducted by using a conversion table, which expresses numerical values of CMYK 8-bit data as corresponding numerical values of RGB 8-bit data, but such method may require too great storage capacity.

The storing capacity can be reduced greatly by using a conversion method such as a tetrahedron method computing RGB data from discrete lattice points of CMYK such as eight discrete lattice points. In the color conversion method using the tetrahedron method, conversion parameters to convert one set of input CMYK data to RGB data are computed based on a relationship between the input CMYK value and the CMYK value at lattice points of tetrahedron, having discrete given values. The conversion parameter for converting from CMYK to RGB can be computed from a conversion parameter set for each lattice point by using a linear interpolation, and the computed conversion parameters can be used to compute RGB values of one set of RGB data. The conversion parameter set for each lattice point can be set in advance by incorporating properties of each apparatus.

Figure 5:
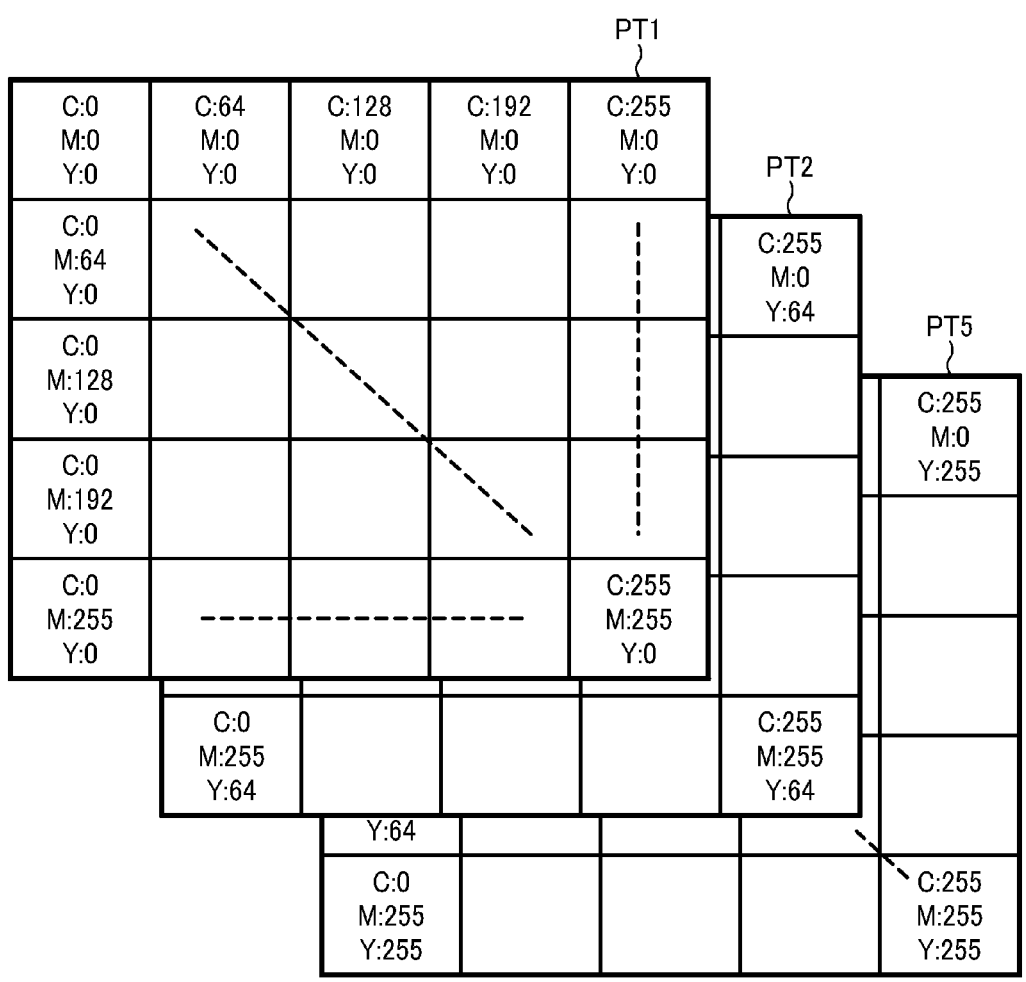
FIG. 5 shows example of color patch data to be used for computing conversion parameters for the color space converter of FIG. 4.

To obtain conversion parameters, for example, color-mixed patches shown in FIG. 5 are output by the image forming apparatus 101, in which color-mixed patches can be prepared by changing the density of each CMYK at lattice points. The output color patches are scanned by the image scanners 131 or 132, and conversion parameters can be computed from the input CMYK value and scanned RGB value. In FIG. 5, data for outputting color patches includes patches PT1 to PT5, in which each of C, M, Y is equally segmented into five segments from 0 (minimum value) to 255 (maximum value) to express the density value of C, M, Y, and patches are prepared by mixing colors. In this example case, the numbers of color-mixed patch is 125.

The image data (RGB 8 bit×3) that has been converted color from CMYK to RGB by the color space converter 306 of the master image generator 211 can be used as master image data for image inspection. Such master image data is generated as data of (RGB, 200 dpi) so that data format of master image data can be matched to data format of scan data of printed image, to be described later.

The buffer 213 receives the master image data (RGB, 8 bit×3) from the master image generator 211 at each time a new master image data is generated by the master image generator 211, and retains such master image data, and then transmits the master image data to the comparing and inspecting unit 215, to be described later.

Each of the image scanners 131 and 132 includes an image scanning device 214 such as a contact image sensor (CIS) but not limited thereto. When the CIS reads an image detection area, RGB data can be generated as scanned image data. When a sheet having formed of image thereon (i.e., printed sheet) printed by the image forming apparatus 101 is transported to the image scanners 131 and 132, the image scanning device 214 scans the printed image. Further, when no sheet is present under the image scanning device 214, the image scanning device 214 may scan noise, which may appear or occur on a scanned image.

The stain detector 217 can detect noise such as stain, which may occur on a scanned image. In this description, noise may mean stain such as stripe image, but is not limited thereto. Specifically, if foreign particles or the like adhere on a contact glass and a reference white plate configuring the image scanners 131 and 132, such particles may appear as noise on the scanned image. Based on the scanned image scanned by the image scanning device 214 and master image data (i.e., model image data for image inspection generated by the master image generator 211), the stain detector 217 can detect noise such as stain.

The detection result such as stain-is-detected and stain-is-not-detected is output to the comparing and inspecting unit 215, and then the comparing and inspecting unit 215 reports an inspection result or detection result to the printer controller 202. If the stain is detected, an image having stain is output using data of (RGB, 200 dpi) to obtain positional information of the stain on the image.

The comparing and inspecting unit 215 compares data of scanned image of printed sheet scanned by the image scanning device 214, and the master image data (RGB, 200 dpi) received from the master image generator 211 via the buffer 213 as model image data, to inspect quality of the printed image. The quality of the printed image can be determined as "OK" or "NG (no good)" by comparing the comparison result and a threshold value set for the quality determination.

Further, when the stain detector 217 detects stain, the comparing and inspecting unit 215 may output "NG." Such NG information is output when the stain detection result is "NG" to instruct a user to remove stain, and to resume the printing operation after removing the stain. However, in some cases, even if the stain detector 217 detects stain, the comparing and inspecting unit 215 conducts the comparing inspection by disregarding the detected stain information, in which "NG" information of the stain detection result may not be used, but the comparing and inspecting unit 215 outputs "OK/NG" information based on the comparing inspection result.

Further, when the stain detector 217 conducts a detection operation, the comparing and inspecting unit 215 reports a stain detection result obtained by using the stain detector 217 to the printer controller 202 with or without conducting a comparing inspection at the comparing and inspecting unit 215. With such a configuration, the stain detection result can be reported to the printer controller 202, and then the printer controller 202 can instruct various operations based on the stain detection result. Specifically, the printer controller 202 can instruct the image inspection apparatus 103 and the image forming apparatus 101 to conduct operations based on the stain detection result. Upon receiving "OK/NG" information, the printer controller 202 instructs various operations such as designating a sheet ejection destination, putting a marking on sheet that is determined as NG, a printing operation using a replacement sheet, or the like.

In the image forming/inspecting system, the image forming apparatus 101 can be configured with a computer as one of its hardware, in which by executing software programs by the computer, the RIP 201, the printer controller 202, and the image forming controller 203 can be devised. Further, the image inspection apparatus 103 can be configured with a computer as one of its hardware, in which by executing software programs by the computer, the master image generator 211, the buffer 213, the comparing and inspecting unit 215, the stain detector 217 can be devised. With such configuration, the data processing flow shown in FIG. 2 can be configured.

(Stain Detection)

A description is given of a detection operation executed by the stain detector 217. The stain detectable by the stain detector 217 may mean noise occurring on scanned images, which may be caused by foreign particles or the like adhering a contact glass and/or a reference white plate configuring the image scanners 131 and 132. The noise may mean foreign particles, which can be removed from the contact glass and/or reference white plate, but not limited these. The noise may mean any kind of adhered materials that may appear as noise on scanned images.

Figure 6:
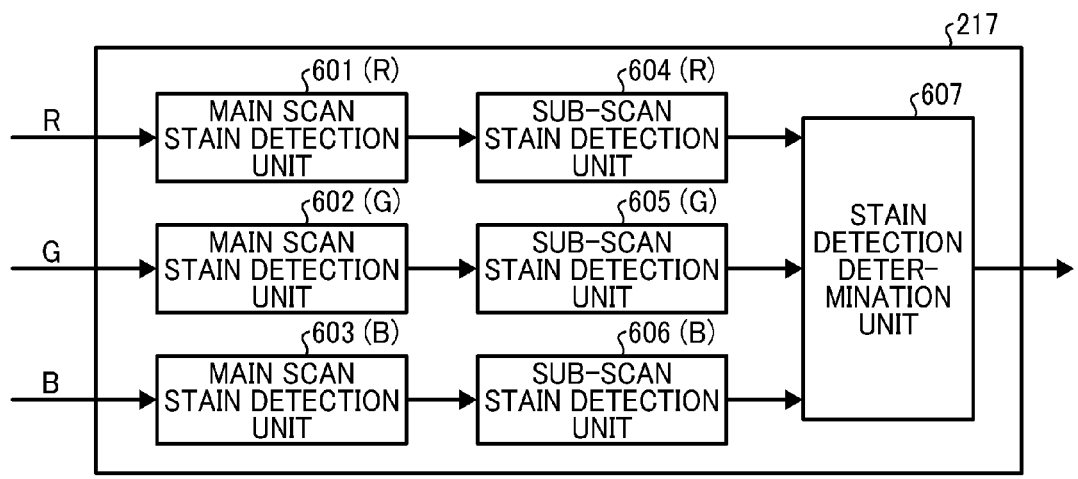
FIG. 6 shows an internal configuration of a stain detector referenced in the data processing flow of FIG. 2.

FIG. 6 shows an internal configuration of the stain detector 217. As shown in FIG. 6, the stain detector 217 includes, for example, main-scan stain detection units 601, 602, 603 for R, G, B, sub-scan stain detection units 604, 605, 606 for R, G, B, and a stain detection determination unit 607. The scanned image scanned by the image scanners 131 and 132 is processed by the gamma correction process and normalized to prepare RGB data. The RGB data is input to the stain detector 217, and then the stain detector 217 outputs a stain detection result based on a stain detection determination.

Figure 7:
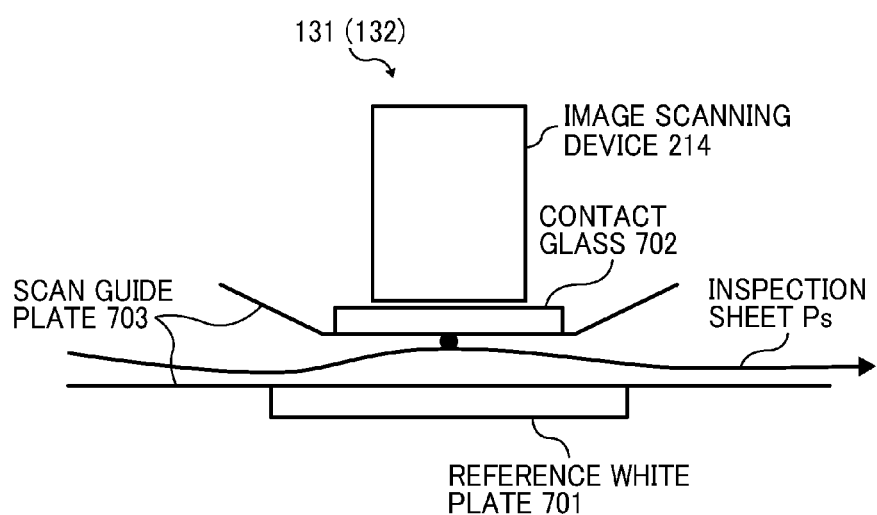
FIG. 7 shows a schematic configuration of an image scanner having an image scanning device and other elements and an image scanning operation.

A description is given of an image scanning configuration of the image scanners 131 and 132, and a relationship of such image scanning configuration and stain such as foreign particles to be detected as detection target. FIG. 7 shows a schematic configuration of the image scanners 131 and 132 having the image scanning device 214 and other elements, in which the image scanners 131 and 132 can be operated with a given manner.

As shown in FIG. 7, each of the image scanners 131 and 132 includes, for example, the image scanning device 214 using a contact image sensor (CIS), a contact glass 702 that is present for a light transmission area of the image scanning device 214, and a reference white plate 701 opposing the contact glass 702, which may be also known as a background scanning plate. Further, a scan guide plate 703 is disposed for each of the contact glass 702 and the reference white plate 701, and an inspection target such as an inspection sheet Ps can be transported in a direction shown by an arrow along a transport route defined by the scan guide plates 703. Further, the contact glass 702 is fitted in an opening formed on the scan guide plate 703. Further, the reference white plate 701 is fixed at a position of the transport route, which faces the scan position of sheets such as inspection sheet Ps.

The inspection target such as the inspection sheet Ps output from the image forming apparatus 101 is transported along the transport route set between the scan guide plates 703, and the image scanning device 214 scans printed image on the inspection sheet Ps.

The contact glass 702 has a function to keep the distance between the inspection sheet Ps and the image scanning device 214 at a constant distance, and thereby the inspection sheet Ps having printed image may contact the contact glass 702. Further, the inspection sheet Ps may also contact the reference white plate 701 opposing the contact glass 702. Therefore, stain such as foreign particles (e.g., toner particles, paper powders) may likely adhere on the contact glass 702 and/or the reference white plate 701 by such contact. The stain detector 217 detects such stain caused by foreign particles as a detection target.

Figure 8A:
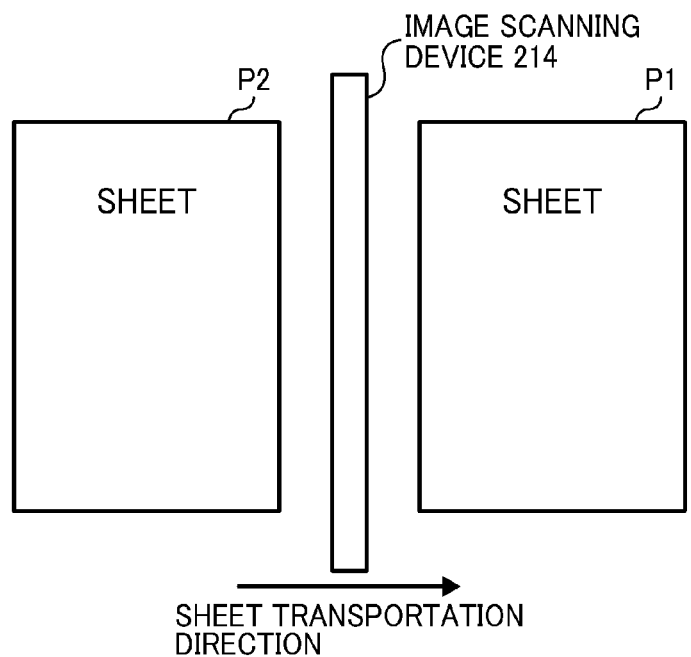
FIG. 8A shows one image scanning operation at a timing when a sheet is not present under a contact glass.

In the stain detector 217 (FIG. 6), the main-scan stain detection units 601, 602, 603 set for R, G, B have the same function. The main-scan stain detection units 601, 602, 603 set for R, G, B can scan the reference white plate 701 when scanning of sheets is not conducted, in which the main-scan stain detection units 601, 602, 603 scan the reference white plate 701 at a timing that no sheets is present between the image scanning device 214 and the reference white plate 701, which is a timing, for example, between one sheet and subsequent sheet transported in one direction (see FIG. 8A), to detect the presence/absence of foreign particles for each main scanning line. Such scanning may be referred to as "scanning without sheet" as shown in FIG. 8A.

The presence/absence of foreign particles is determined based on the difference between the density of concerned pixel (i.e., inspection target pixel) and the density of surrounding pixels in the main scanning direction, and the determination result is output as a detection result. The scanning/detection process can be conducted by a pipeline method that determines pixel conditions sequentially from the front edge pixel in the main scanning direction.

Further, the determination result at each pixel position in the main scanning line is input to the sub-scan stain detection units 604, 605, 606 line by line. Specifically, the presence/absence of foreign particles in the main scanning line can be determined as follows. For example, if image data input to the main-scan stain detection units 601, 602, 603 for R, G, B has met at least one of the following condition 1 and condition 2, it is determined that foreign particles is present.

Condition 1: if the density of concerned pixel (i.e., inspection target pixel) is the threshold value th1 or more, and if the density of concerned pixel is greater than the density of the closest pixel, existing before the concerned pixel, by the threshold value thd or more.

Condition 2: if it is determined that foreign particles is present on the closest pixel, existing before the concerned pixel, based on the determination result, and if the density of concerned pixel is the threshold value th2 or more. In such conditions 1 and 2, the threshold value th1 is set greater than the threshold value th2 (th1>th2).

The density of pixel becomes small or pale as the numerical value of image data becomes greater, and becomes great or thick as the numerical value of image data becomes smaller. Typically, the inspection target such as foreign particles can be appeared as an image composed of continuously existing pixels having thick density. To detect such foreign particles effectively, the above condition 1 may be applied to detect the front edge pixels of foreign particles, and the above condition 2 may be applied after detecting the front edge pixels so as to detect other foreign particles efficiently. The threshold value th1, the threshold value th2, the threshold thd are parameters used for detecting foreign particles, set before conducting the image scanning operation, and such parameters can be changed depending on the input RGB image data.

Foreign particles may adhere on the contact glass 702 as follows: very small amount of some adhesive agent adhering on a sheet may adhere on the contact glass 702 of the image scanning device 214 employing a sheet-through system; then foreign particles such as paper powders and toner particles may adhere on the adhesive agent as a core of adhering foreign particles. Such adhered foreign particles may glow gradually. Therefore, if scanning lines scanned by the image scanning device 214 are apart with each other among R channel, G channel, and B channel, foreign particles may occur only any one of R, G, and B channels at initial occurrence stage of foreign particles. When such foreign particle adhering occurs, a stripe image occurs at a position that foreign particles adhere. Such stripe image may occur at initial occurrence stage of foreign particles even when foreign particles appear in only one of R, G, and B channels.

Therefore, to detect an occurrence of stripe image on the contact glass 702 at R line alone caused by adherence of foreign particles, parameters (i.e., threshold values th1, th2 and thd) used by the main-scan stain detection unit 601(R) to detect foreign particles are set to given values so that the occurrence of stripe image at R line alone can be detected. Further, similar to the main-scan stain detection unit 601(R), parameters (i.e., threshold values th1, th2 and thd) used the G main-scan stain detection unit 602(G), and the main-scan stain detection units 603(B) are set.

Each of the sub-scan stain detection units 604, 605, 606 for R, G, B (FIG. 6) receives the detection result from the corresponding main-scan stain detection units 601, 602, 603 for R, G, B, wherein the detection result indicates the presence/absence of foreign particles at each pixel position in the main scanning line determined by the main-scan stain detection units 601, 602, 603.

Such detection result indicating the presence/absence of foreign particles in the main scanning line is input to the sub-scan stain detection units 604, 605, 606 for a given detection area, corresponding given number of lines, line by line. Based on such input detection result, the corresponding sub-scan stain detection units 604, 605, 606 detect the presence/absence of foreign particles in the sub-scanning direction.

When such sub-scan stain detection is conducted from the first line to the last line in the detection area, positions or coordinates used for sub-scan stain detection are the same positions or coordinates on the main scanning line, which are determined that foreign particles is present/absent by the main-scan stain detection units 601, 602, 603.

Therefore, if the stain such as foreign particles is detected at the same position for two times consecutively, it can be determined that foreign particles are present on the concerned position on the sub-scanning direction, and a detection result is obtained. Upon obtaining such detection result, the sub-scan stain detection units 604, 605, 606 for R, G, B reports a final detection result indicating the presence/absence of foreign particles to the stain detection determination unit 607. Further, such reported detection result includes the positions or coordinates on the main scanning line that it is determined that foreign particles is present.

If the inspection target image is an image of multi-color using at least two colors, the stain detection determination unit 607 determines that foreign particles is present when the detection result of any one of the sub-scan stain detection units 604, 605, 606 for R, G, B indicates that foreign particles is present.

As such, the stain detection determination unit 607 can determine the presence/absence of foreign particles, and transmits a detection result whether foreign particles is present or absent. If it is determined that foreign particles is present by the stain detection determination unit 607, the stain detector 217 transmits the detection result indicating positions or coordinates of foreign particles to the comparing and inspecting unit 215.

With the above described configuration, the reference white plate 701 can be scanned by scanning the reference white plate 701 without the presence of sheet, which is at a timing that no sheets is present at the scan position, by which a scanned image of the reference white plate 701 can be obtained to detect noise such as stain on the reference white plate 701. (Identification of stain source or origin)

As above described, the stain detector 217 can detect noise such as stain on the reference white plate 701 using the scanned image, scanned at the timing of scanning without sheet.

In one case, the stain on the reference white plate 701 may not directly cause degradation of the inspection precision. Specifically, such inspection can be conducted when the noise such as stain is detected on the reference white plate 701 by scanning the reference white plate 701 without the presence of sheet, which is at a timing that no sheets is present at the scan position, but no stain is present on the contact glass 702, which means noise does not occur on the contact glass 702. In this case, the stain is detected on the reference white plate 701 by conducting the stain detection operation, but sheets having printed images can be transported to the scan position to scan the printed images as inspection target images, and the inspection precision can be maintained at a good enough level.

When an image inspection is conducted under such condition that the reference white plate 701 has stain and the contact glass 702 has no stain, and the printed sheet (i.e. inspection target) is transported and present between the reference white plate 701 and the image scanning device 214, the noise on the reference white plate 701 may not affect the scanning the printed image. Therefore, the image inspection apparatus 103 can inspect the printed image without noise effect, by which the inspection precision can be maintained at a good enough level.

However, another case can be assumed, in which the contact glass 702 has also stain thereon, which means that noise occurs on both of the contact glass 702 and the reference white plate 701. Because the noise on the contact glass 702 may be scanned without the presence of sheet, which is at a timing that no sheets is present at the scan position, the noise on the contact glass 702 may appear on a scanned image of the inspection target. If the scanning of printed sheet is conducted under such condition to inspect the printed image, the noise of the contact glass 702 is scanned with the printed image, and such noise degrades the inspection precision.

As such, a stain image caused by noise on the contact glass 702 may appear on a scanned image of printed image (i.e., inspection target). Therefore, it is devised to separately detect the origin of stain image, in which it can identify that the stain occurs on the contact glass 702 but not on the reference white plate 701.

The stain on the reference white plate 701 and/or the contact glass 702 degrades the inspection precision of the image inspection apparatus 103, and also degrades image quality of images printed by the image forming apparatus 101. Therefore, image quality can be enhanced by removing the stain.

As described in this disclosure, it can identify which one of the reference white plate 701 and the contact glass 702 causes stain, and such detection and identification information can be used for removing the stain. Such identification process may be referred to a noise source identification detection.

Such noise source identification detection can be devised by conducting a scanning operation for the contact glass 702 by the image scanners 131 and 132, separately conducted from a scanning operation for the reference white plate 701. The scanning operation for the contact glass 702 can be conducted at a given timing, to be described later.

Figure 8B:
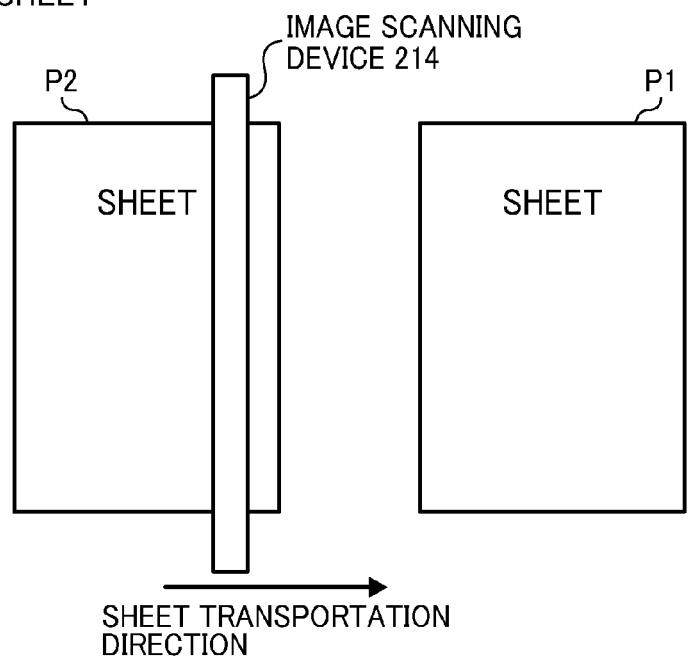
FIG. 8B shows another image scanning operation at a timing when a sheet is present under a contact glass.

FIGS. 8A and 8B show configurations to scan a stain image on the contact glass 702 by the image scanning device 214 that scans inspection target sheets (hereinafter, sheets P1 and P2) moving in a direction transportation shown by an arrow. In the configurations of FIGS. 8A and 8B, the image scanning device 214 is disposed, for example, above the contact glass 702 and the reference white plate 701. Relative positions of the image scanning device 214, the contact glass 702, and the reference white plate 701 can be changed within the scope of the present invention.

FIG. 8A shows a configuration that the image scanning device 214 conducts a scanning operation when the sheets P1 and P2 moving in a direction transportation shown by an arrow are not present under the image scanning device 214, and the contact glass 702 is scanned by the image scanning device 214 at this timing. At this timing, the image scanning device 214 can also scan the reference white plate 701. Therefore, if stain is present on both of the reference white plate 701 and the contact glass 702, the image scanning device 214 scans two images having stains by superimposing them.

In contrast, FIG. 8B shows a configuration that the image scanning device 214 conducts a scanning operation when any one of the sheets P1 and P2 moving in a direction transportation shown by an arrow is present under the image scanning device 214, and the sheet is scanned at this timing (hereinafter, such scanning operation may be referred to as "scanning on sheet"). At this timing, the image scanning device 214 illuminates a scan light to the sheet P2 and receives a reflected light from the sheet P2. Because the scan light does not reach the reference white plate 701 at this timing, the reference white plate 701 is not scanned, and if stain is present on the contact glass 702, a stain image is scanned. However, if the sheet P2 has an inspection target image, the target image is scanned with the stain image of the contact glass 702, which means the inspection target image and the stain image are superimposingly scanned. Therefore, the stain image of the contact glass 702 alone may not be detected.

In view of such problem, the image inspection apparatus 103 is devised to detect a blank area on an inspection target sheet so that the stain image on the contact glass 702 alone can be detected by scanning the blank area, by which a scanned image of printed image is not mixed with a scanned image of the contact glass 702. The stain detector 217 can be used to find the blank area from the inspection target sheet. Specifically, the stain detector 217 can receive the master image data (i.e., model image data for image inspection) generated by the master image generator 211 (FIG. 2). Based on the master image data, the stain detector 217 can find the blank area information, and can determine a given timing to scan the blank area. By scanning the blank area at the given timing, the image inspection apparatus 103 can conduct a stain detection in one sheet at a preferable timing.

As such, by scanning the blank area in one sheet, the stain image on the contact glass 702 alone can be scanned. Therefore, if a stain image is not detected by a scanning operation of the blank area conducted in one sheet, and a stain image is detected by conducting a scanning operation without sheets, it can be determined that the detected stain image is caused by stain adhered on the reference white plate 701. Further, if a stain image is detected by a scanning operation of the blank area conducted in one sheet, it is determined that the detected stain image is caused by stain adhered on the contact glass 702.

Therefore, if the stain image occurs due to only a stain on the reference white plate 701, it can be determined that the inspection of printed images can be continued, and further a printing operation including such inspection of printed image can be continued.

Further, as above described, a stain-image causing source or stain origin can be detected or identified separately between the reference white plate 701 and the contact glass 702, by which a noise-removing target can be identified when instructing a removal of noise.

(Printing Operation Based on Noise Source Identification Detection)

A description is given of a control of printing operation based on a stain-image causing source detection, which can detect or identify the stain-image causing source separately.

As above described, in the stain-causing source identification process, the stain-causing source can be identified separately between the reference white plate 701 and the contact glass 702. Based on the stain-causing source identification process, the printer controller 202 can instruct the image inspection apparatus 103 and the image forming apparatus 101 to conduct operations, to be described as below, corresponding to the stain-causing source identification process, by which the precision of image inspection may not deteriorate, and image quality of output image can be maintained.

FIG. 9 shows a first example flowchart of a control process for a printing operation conduct-able based on a stain detection result, which identifies the stain-image causing source separately.

Upon receiving a print request, the printer controller 202 activates the printer engine and the control process shown in FIG. 9. From the time of receiving the print request to the completion of the printing operation, the stain detector 217 can continuously conduct a detection operation with a given time interval. When the control process is started, at first, the printer controller 202 obtains a result of stain detection conducted by the stain detector 217 at scanning without sheets, in which the image scanning device 214 is activated for a scanning operation at a timing that an inspection target printed sheet is not being passed through the image scanning device 214. Specifically, it is checked whether a stain detection result indicates an occurrence of a stain image such as a stripe image (step S101). The process of step S101 may be referred to a first stain detection process.

Even if the stripe image is detected (step S101:YES) based on the stain detection result, it cannot be identified which one of the reference white plate 701 and the contact glass 702 is the stain-image causing source. Further, even if the stripe image is not detected (step S101:NO), it does not automatically mean that there is no malfunction because a detection failure may occur due to malfunctioning or the like in some cases. Therefore, the printing operation is continued, and a second stain detection process is conducted to effectively determine whether the stripe image actually occurs and determine the origin of stripe image.

With such reasons, after determining the presence/absence of the stripe image at step S101, the process goes to step S102 if the stripe image is detected (step S101:YES), and the process goes to step S105 if the stripe image is not detected (step S101:NO). At steps S102 or S105, the printer controller 202 checks a stain detection for transported printed sheet conducted by the stain detector 217 using the image scanning device 214 (i.e., stain detection in the blank area of the printed sheet is conducted). Then, the process goes to subsequent steps based on the detection result at steps S102 or S105.

If the stripe image is detected by scanning without sheets (step S101:YES) and if the stripe image is detected by the scanning on sheet (step S102:YES), it can determine that the stain-image causing source is the contact glass 702, and thereby the printer controller 202 instructs an user interface such as the control unit 102 having the display unit to display a prompt that the stripe image occurs (step S103) to alert cleaning, and ends the control process. At step S103, the printer controller 202 reports the control unit 102 that the stripe image occurs on the contact glass 702 with coordinates of the stain-occurring position as display information. Then, the control unit 102 reports the stain occurring information including the stain-occurring position on the contact glass 702 to a user to prompt the user to remove the stain.

Further, if the stripe image is detected by scanning without sheets (step S101:YES) and if the stripe image is not detected by the scanning on sheet (step S102:NO), it can determine that the stain-image causing source is the reference white plate 701, and thereby the printer controller 202 instructs an user interface such as the control unit 102 having the display unit to display a prompt that the stripe image occurs (step S104) to alert cleaning, and ends the control process. At step S104, the printer controller 202 reports the control unit 102 that the stripe image occurs due to the reference white plate 701 and coordinates of the stain-occurring position as display information. Then, the control unit 102 reports the stain occurring information including the stain-occurring position on the reference white plate 701 to prompt or alert a user to remove or clean the stain.

Further, as for the image forming/inspecting system, at step S103 or S104, the stain information is reported to the user via the control unit 102 and is displayed as a stain removal prompt or stain cleaning alert. After displaying the stain removal prompt, the operation of the printer engine can be suspended until the stain is removed and then the stain is not detected anymore, or the operation of the printer engine may not be suspended and the printing and image inspections may be continued.

If the printing and image inspections are continued, sheets printed with failed images are, for example, ejected to a given tray. Further, if the image forming/inspecting system uses a method of determining some print products are as failed products, some printed images having no problems may be rejected as failed products. Therefore, it is preferable that the stain removal prompt output-able at step S103 or step S104 includes a message that stain removal should be conducted immediately.

In contrast, if the stripe image is not detected by scanning without sheets (step S101:NO) and if the stripe image is detected by the scanning on sheet (step S105:YES), the detection results at step S101 and at step S105 contradict with each other. This situation may indicate that some abnormality may occur during the detection process, by which an abnormal detection may be conducted. When such abnormal detection occurs, the printing operation is suspended to check the stain detection process (step S106), and ends the control process. At step S106, the printer controller 202 reports a user interface such as the control unit 102 that the abnormal detection occurs and displays that the printing operation is suspended on the display unit.

Further, if the stripe image is not detected by scanning without sheets (step S101:NO) and if the stripe image is not detected by the scanning on sheet (step S105:NO), the detection results at step S101 and at step S105 match with each other, by which the detection results can be positively confirmed. Therefore, the printing operation can be continued without any further process (step S107), and ends the control process.

As above described with the control process of FIG. 9, in the image forming/inspecting system, when a stain is detected, stain occurrence and stain information is reported to the user via the control unit 102 to display the stain removal prompt. Then, the printer engine is stopped until the stain is removed by the removal and the stain is not detected anymore. However, in some cases, it may be difficult to stop a printing operation of the image forming apparatus 101, and it may be preferable not to suspend such printing operation.

A description is now given of an operation disregarding a print-suspension activation, in which stain is detected but a printing operation is continued. In such disregarding operation, it is required to ignore stain information when an image inspection is conducted for printed image because if the detected stain information is not ignored, it may be instructed to stop the printing operation and inspection operation.

The operation disregarding print-suspension activation can be devised by comparing the inspection target image data and model image data using the comparing and inspecting unit 215 under a condition that detected stain image is not used for such comparing process.

As shown by a dotted arrow B in FIG. 2, when a stain image is detected by the stain detector 217 by conducting the scanning without sheets, the data of stain image including stain positional information is transmitted to the comparing and inspecting unit 215. By referring such stain image data, the comparing and inspecting unit 215 can inspect printed image by excluding the stain image data from data used for the comparing process.

The stain image data can be excluded from data used for comparing process as follows. For example, gate signals that are active at stain positions in the main scanning direction, or numerical value information corresponding to pixel position of stain image in the main scanning direction can be used to exclude stain image data from data used for the comparing process. By using such method, the comparing and inspecting unit 215 can compare the RGB master image generated by the master image generator 211 and RGB data of printed image output from the image scanners 131 and 132 while excluding the stain image data from the data used for such comparing process. Further, because stains may adhere at a plurality of points in the main scanning direction, it is preferable that stain positional information can designate a plurality of points in the main scanning direction.

With such a configuration, if the numbers of stain point is small, stain removal may not be required to be conducted each time the stain occurs, but stain removal can be conducted between jobs when the numbers of stain point exceeds an allowable level after printing a given numbers of sheets. With such removal, the inspection of printed images can be conducted efficiently.

Further, the above-described operation disregarding print-suspension activation is applied when the stain detector 217 detects stain on the blank area of printed sheet by the scanning on sheet. Such operation disregarding print-suspension activation can avoid the stop of printing operation, but the image quality of output image may deteriorate. Therefore, if this operation disregarding print-suspension activation is to be applied, a user instruction may be preferably required. A user can instruct the operation disregarding print-suspension activation by setting a disregarding operation mode when instructing a print request using the control unit 102. Further, when the stain is detected on the contact glass 702 (step S103 of FIG. 9) during the control process, the stain prompt is displayed by the control unit 102 without stopping the printing operation, and then a user can select the operation disregarding print-suspension activation on the screen.

In the image forming/inspecting system using the image inspection apparatus 103, as shown in FIGS. 6 to 9, the stain on the contact glass 702 alone can be detected by using the master image data generated by the master image generator 211, and a blank area data of printed image sheet. However, when the stain detector 217 of the image inspection apparatus 103 is changed to advanced-type detectors, such advanced detectors may employ different interfaces, by which master image data may not be received even if the detection method is the same.

Second Example Embodiment

A description is given of second example embodiment using another configuration that a stain detector cannot receive the master image data wherein the hardware configuration is not changed from the above-described configuration. For ease of understanding, the stain detector used for the second example embodiment is referred to as a stain detector 217A. In such configuration, the stain on the contact glass 702 alone can be detected similar to the above-described configuration using the master image data in the first example embodiment.

Specifically, in the second example embodiment, as for the scanning on sheet, instead of using the master image data, a blank sheet is passed under the image scanning device 214 to scan a blank area, and a control process adapted for such method is devised so that the stain detection can be conducted similar to the above described configuration using the master image data in the first example embodiment. Such image data obtainable by using the blank area of the blank sheet can be used similar to the image data obtainable by scanning the blank area from the master image data.

Figure 10:
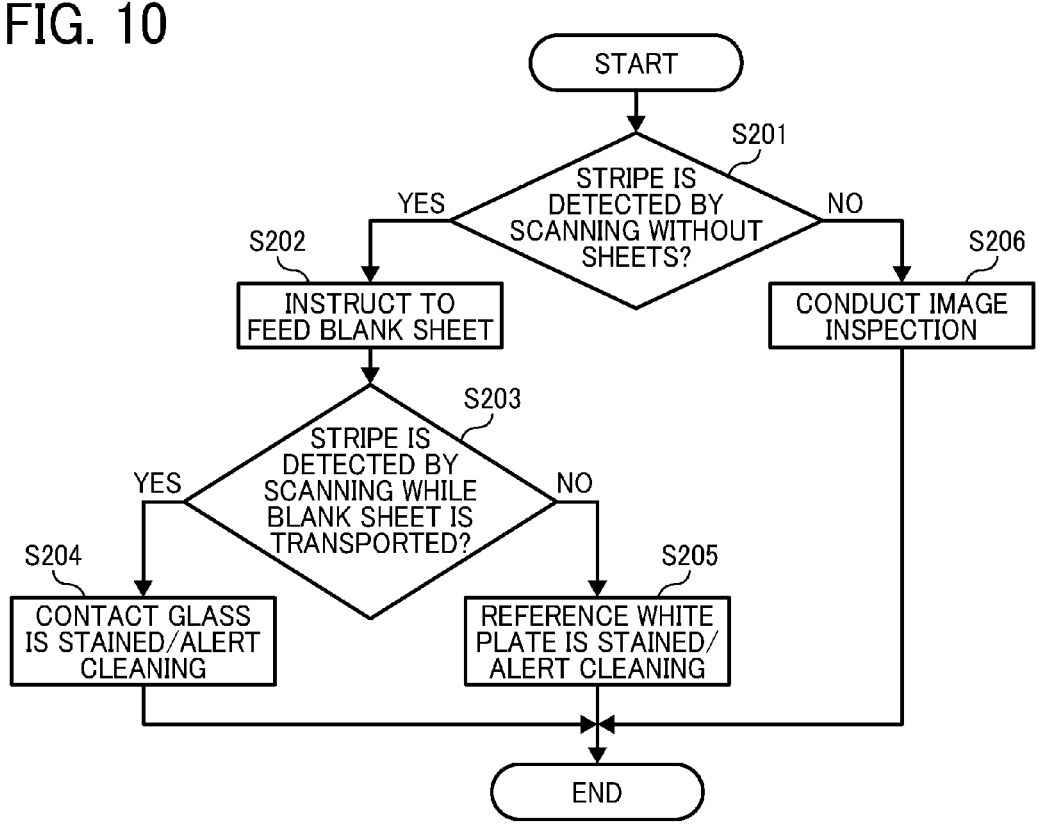
FIG. 10 shows another flowchart of a control process for a printing operation conduct-able based on a stain detection result, which can identify a stain-image causing source separately.

FIG. 10 shows a second flowchart of a control process for a printing operation conduct-able based on a stain detection result, which identifies the stain-image causing source separately according to the second example embodiment. The data processing flow (see FIG. 2) of the first example embodiment using the master image data and the data processing flow of the second example embodiment are common except a process of detecting stain by scanning on sheet.

Upon receiving a print request, the printer controller 202 activates the printer engine and the control process shown in FIG. 10. From the time of receiving the print request to the completion of the printing operation, the stain detector 217A may continuously conduct a detection operation with a given time interval. When the control process is started, at first, the printer controller 202 obtains a result of stain detection conducted by the stain detector 217A at scanning without sheets, in which the image scanning device 214 is activated for a scanning operation at a timing that an inspection target printed sheet is not being passed through the image scanning device 214. Specifically, it is checked whether a stain detection result indicates an occurrence of a stain image such as a stripe image (step S201).

Even if the stripe image is detected (step S201:YES) based on the stain detection result, it cannot be identified which one of the reference white plate 701 and the contact glass 702 is the stain-image causing source. Therefore, if the stripe image is detected (step S201:YES), the printer controller 202 conducts a stain detection operation by scanning on sheet to identify the stain-image causing source. Because the stain detection operation by scanning on sheet is conducted by passing a blank sheet under the image scanning device 214, the printer controller 202 instructs an user interface such as the control unit 102 to display a message of "feed blank sheet" on the display unit, by which an user is instructed to feed the blank sheet (step S202). The blank sheet can be fed by the user, but the blank sheet can be fed by the image forming apparatus 101 automatically at step S202, in which the blank sheet is fed to the image forming apparatus 101 and then ejected without conducting an image forming operation by the printer engine, and the ejected blank sheet is then scanned by a least one of the image scanners 131 and 132.

Upon feeding the blank sheet, the stain detector 217A conducts a stain detection operation by scanning on sheet. Upon receiving the detection result from the stain detector 217A, the printer controller 202 instructs various operations based on the detection result. In the control process of FIG. 10, if the stripe image is detected by scanning without sheets (step S201: YES) and if the stripe image is detected by the scanning on sheet when the blank sheet is fed (step S203: YES), it can determine that the stain-image causing source of the stripe image is the contact glass 702, and thereby the printer controller 202 instructs an user interface such as the control unit 102 having the display unit to display a prompt that the stripe image occurs (step S204) to alert cleaning, and ends the control process. At step S204, the printer controller 202 reports the control unit 102 that the stripe image occurs on the contact glass 702 and coordinates of the stain-occurring position as display information. Then, the control unit 102 reports the stain occurring information including the stain-occurring position on the contact glass 702 to a user to prompt the user to remove the stain.

Further, if the stripe image is detected by scanning without sheets (step S201:YES) and if the stripe image is not detected by the scanning on sheet when the blank sheet is fed (step S203:NO), it can determine that the stain-image causing source of the stripe image is the reference white plate 701, and thereby the printer controller 202 instructs an user interface such as the control unit 102 having the display unit to display a prompt that the stripe image occurs (step S205) to alert cleaning, and ends the control process. At step S205, the printer controller 202 reports the control unit 102 that the stripe image occurs due to the reference white plate 701 and coordinates of the stain-occurring position as display information. Then, the control unit 102 reports the stain occurring information including the stain-occurring position on the reference white plate 701 to a user to prompt or alert the user to remove or clean the stain. Further, when a stain removal prompt is issued at step S204 and step S205, continuation of print operation and the operation disregarding print-suspension activation described with FIG. 9 can be similarly conducted.

Further, if the stripe image is not detected by scanning without sheets (step S201:NO), the printing operation can be continued without any further specific process, and the ejected sheet is scanned by the image scanners 131 and 132. The comparing and inspecting unit 215 compares the scanned printed image data and the master image data to obtain an inspection result indicating "OK/no good (NG)" of printed image, and outputs the inspection result to the printer controller 202. The printer controller 202 receives the inspection result (step S206), and ends the control process.

(Process Return to Normal Operation)

When stain is detected by the stain detectors 217 or 217A, the image inspection apparatus 103 typically reports "NG" to the printer controller 202. Upon receiving the "NG" report, the printer controller 202 stops the printer engine, and conducts a process to stop the printing operation, and a process to remove the stain. The printer engine is stopped to prevent outputting images with lower image quality needlessly, and further, the printer engine is required to be stopped for the stain removal by a user. However, it is preferable to stop the printing operation as short as possible, for which the stain cause is required to be removed as soon as possible to set the system at a condition that can output images with high quality. A description is given of a process for returning to a normal operation.

Figure 11:
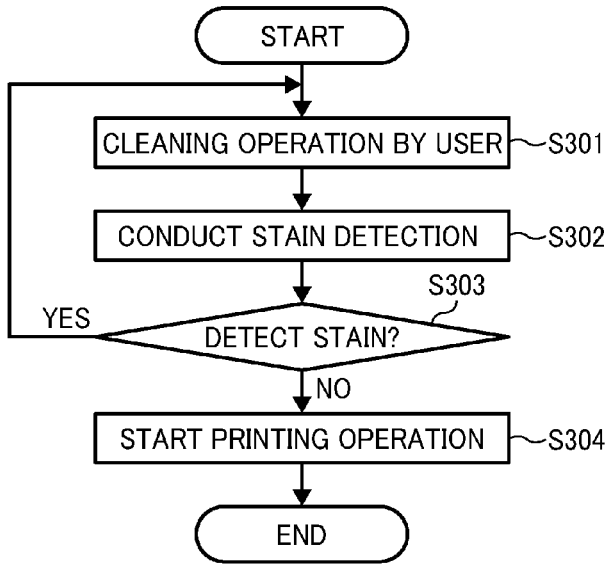
FIG. 11 shows a flowchart of control process of returning to a printing operation stopped by a stain detection.

FIG. 11 shows a flowchart of control process of returning to a printing operation, which is stopped by due to a detection of stain. Upon receiving a stain detection including stain information from the image inspection apparatus 103, the printer controller 202 stops the printer engine, and reports a stain removal prompt to a user via the control unit 102. The stain removal prompt informs the user which one of the reference white plate 701 and the contact glass 702 has stain, and a stain occurring position to instruct the user for the stain removal or cleaning operation.

Upon issuing the stain removal prompt, the printer controller 202 initiates the control process of FIG. 11. At first, the printer controller 202 confirms whether the user have completed a stain removal or cleaning (step S301). Such confirmation may be detected when the user inputs the completion of removal on the display unit such as a screen, which displays the removal prompt, and the stop condition is kept if no such user input operation is conducted. Further, the control process of FIG. 11 can be set to resume if a given time elapses without such user input operation. Upon confirming the completion of removal or cleaning (step S301), the printer controller 202 instructs the image inspection apparatus 103 to conduct a stain detection (step S302). Such instruction can be issued at any timing after confirming the completion of removal, and can be instructed by a user operation or automatically after confirming the completion of removal.

After conducting the stain detection (step S302), the printer controller 202 checks a detection result whether the stain detector 217 or 217A detects the stain such as foreign particles (step S303).

If the stain image is still detected (step S303:YES), a removal prompt is issued again, and the printer controller 202 instructs the user to conduct another removal or cleaning. If the stain image is not detected (step S303:NO), the printer controller 202 cancels the stop of printing operation, and returns the system to the printing operation, in which the printer controller 202 returns the printer engine to an activation condition to start the printing operation (Step S304).

As above described, based on the stain detection for the scanning without sheets and the scanning on sheet, it can detect or identify which one of the reference white plate 701 and the contact glass 702 is the stain-image causing source or origin. Based on such stain detection, the stain-image causing source can be identified, and a message including stain occurrence and removal prompt can be displayed. Further, in view of the detected stain, a continuation of image inspection and/or printing operation, a suspension of image inspection and/or printing operation, and an operation of disregarding print-suspension activation can be selectively conducted by the image inspection apparatus 103 and the image forming apparatus 101, by which the precision of image inspection, and working performance of the total system can be maintained at a good enough level because stopping of image inspection such as stopping of scanning, and stopping of printing operation can be reduced in the above described configuration.

In the above described example embodiment, printout sheets sequentially transported in a direction can be scanned by an image scanning device, and then an image inspection is conducted for output images by comparing image data obtained by scanning printout sheets, and model image data. The image scanning device includes a contact glass and a reference white plate, to which foreign particles or the like may adhere as stain and become noise. Such noise can be detected while identifying the stain origin or source based on a detection result. By identifying the stain origin, a scanning operation can be continued even when stain is detected on the reference white plate, by which the precision of image inspection, and working performance of the total system can be maintained at a good enough level because stopping of image inspection such as stopping of scanning, and stopping of printing operation can be reduced in the above described configuration.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented in hardware or as a combination of hardware/software combination. In example embodiment, processing units, computing units, or controllers can be configured with using various types of processors, circuits, processing devices, processing circuits or the like such as a programmed processor, a circuit, an application specific integrated circuit (ASIC), used singly or in combination. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit does include the above-described hardware executing software.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image inspection apparatus configured to inspect images output on sheets including an inspection sheet and transported along a transport route inside the image inspection apparatus by comparing inspection target image data obtained by scanning the inspection sheet with model image data generated from print data used for outputting the images, the image inspection apparatus comprising:
 a reference white plate used for a correction process, disposed at a position along the transport route facing a scan position for scanning the sheets;
 a contact glass disposed opposite the reference white plate;
 an image scanning device fixed at the scan position configured to iteratively conduct a first scanning operation and a second scanning operation through the contact glass;
 a noise detector employing a processor configured to,
  detect a first noise image in a blank area of the inspection sheet during the first scanning operation, the first scanning operation including scanning the blank area of the inspection sheet with the image scanning device when any sheet of the sheets is present over the reference white plate, and
  detect a second noise image in the reference white plate during the second scanning operation, the second scanning operation including scanning the reference white plate at a timing after at least one sheet of the sheets has been scanned and when any sheet of the sheets is not present over the reference white plate; and
 a stain source determination unit using the processor configured to identify whether a noise originates from the contact glass or the reference white plate, and in the identifying the noise, the stain source determination unit is configured to,
  determine that the contact glass has a stain when the noise detector detects the first noise image when the inspection sheet is present over the reference white plate during the first scanning operation, and
  determine that the reference white plate has a stain when the noise detector does not detect the first noise image but does detect the second noise image during the timing when any sheet of the sheets is not present over the reference white plate during the second scanning operation.

2. The image inspection apparatus of claim 1, further comprising:
 a controller configured to use the processor to continue a process of comparing the inspection target image data and the model image data when the stain source determination unit determines that the reference white plate has a stain and the stain source determination unit determines that the contact glass has no stain.

3. The image inspection apparatus of claim 2, further comprising:
 a reporting unit configured to report a status of the image inspection apparatus externally,
 wherein the controller is configured to instruct the reporting unit to report a stain determination result obtained by the stain source determination unit and prompt removal of the stain.

4. The image inspection apparatus of claim 1, further comprising:
 a controller configured to use the processor to suspend a process of comparing the inspection target image data with the model image data when the stain source determination unit determines that the contact glass has a stain.

5. The image inspection apparatus of claim 4, wherein the controller is further configured to continue the process of comparing the inspection target image data and the model image data under a condition that image data corresponding to the identified stain is excluded from the process of comparing when the stain source determination unit determines that the contact glass has the stain.

6. The image inspection apparatus of claim 1, further comprising:
 a blank area data generator configured to use the processor to generate blank area data from a blank image area in an effective image area of the model image data,
 wherein the noise detector is configured to detect the first noise image in the blank area of the inspection target image data based on the blank area data generated by the blank area data generator.

7. The image inspection apparatus of claim 1, wherein the noise detector is configured to detect the first noise image in the blank area of the inspection sheet upon the inspection sheet passing under the image scanning device.

8. An image forming apparatus comprising the image inspection apparatus of claim 1, wherein
 the image inspection apparatus is configured to inspect images formed by the image forming apparatus and transmits an inspection result to a microprocessor that controls operation of the image forming apparatus.

9. A method of inspecting images output on sheets including an inspection sheet that are transported along a transport route inside an image inspection apparatus by comparing inspection target image data obtained by scanning the inspection sheet with model image data generated from print data used for outputting the images, using the image inspection apparatus including a reference white plate disposed at a position of the transport route facing a scan position for scanning the sheets, the reference white plate being used for a correction process, a contact glass disposed opposite the reference white plate, an image scanning device fixed at the scan position to iteratively conduct a first scanning operation and a second scanning operation through the contact glass, and the method comprises:
 detecting a first noise image in a blank area of the inspection sheet by scanning the blank area of the inspection sheet during the first scanning operation, the first scanning operation including scanning the blank area of the inspection sheet with the image scanning device when any sheet of the sheets is present over the reference white plate;
 detecting a second noise image during the second scanning operation, the second scanning operation including scanning the reference white plate after at least one sheet of the sheets has been scanned and at a timing when any sheet of the sheets is not present over the reference white plate;
 determining that the contact glass has a stain when the noise detector detects the first noise image when the inspection sheet is present over the reference white plate during the first scanning operation; and
 determining that the reference white plate has a stain when the noise detector does not detect the first noise image and the noise detector detects the second noise image during the timing when any sheet of the sheets is not present over the reference white plate during the second scanning operation.

10. A non-transitory computer-readable storage medium storing a program that, when executed by a computer, configures the computer to:
inspect images output on sheets including an inspection sheet transported along a transport route inside an image inspection apparatus by comparing inspection target image data obtained by scanning the inspection sheet with model image data generated from print data used for outputting the images, using the image inspection apparatus including a reference white plate disposed at a position of the transport route facing a scan position for scanning the inspection sheet, the reference white plate being used for a correction process, a contact glass disposed opposite the reference white plate, an image scanning device fixed at the scan position to iteratively conduct a first scanning operation and a second scanning operation through the contact glass, and in inspecting the images, the computer is configured to:
detect a first noise image in a blank area of the inspection sheet by scanning the blank area of the inspection sheet during the first scanning operation, the first scanning operation including scanning the blank area of the inspection sheet with the image scanning device when any sheet of the sheets is present over the reference white plate;
detect a second noise image during the second scanning operation, the second scanning operation including scanning the reference white plate after at least one sheet of the sheets has been scanned and at a timing that any sheet of the sheets is not present over the reference white plate;
determine that the contact glass has a stain when the noise detector detects the first noise image when the inspection sheet is present over the reference white plate during the first scanning operation; and
determine that the reference white plate has a stain when the noise detector does not detect the first noise image and the noise detector detects the second noise image during the timing when any sheet of the sheets is not present over the reference white plate during the second scanning operation.

* * * * *